Oct. 18, 1966 D. G. THOMAS ETAL 3,279,779
COMBINED DISC AND ELASTOMERIC SPRING
Filed July 20, 1964 2 Sheets-Sheet 1
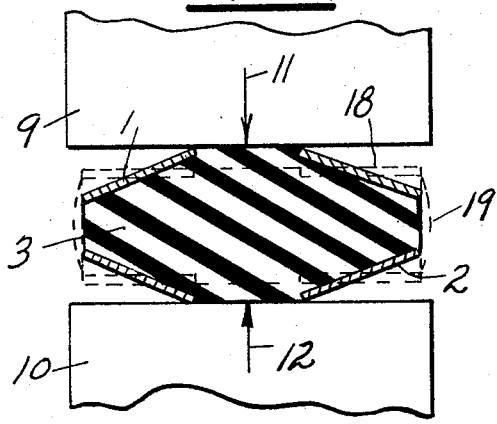
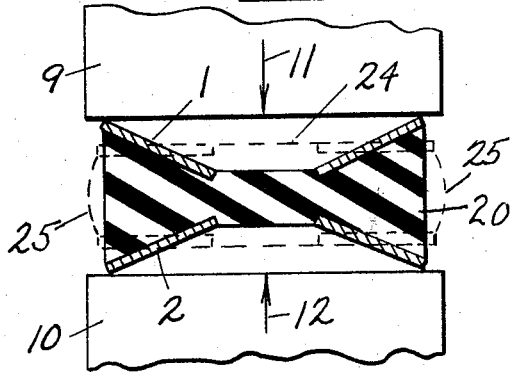
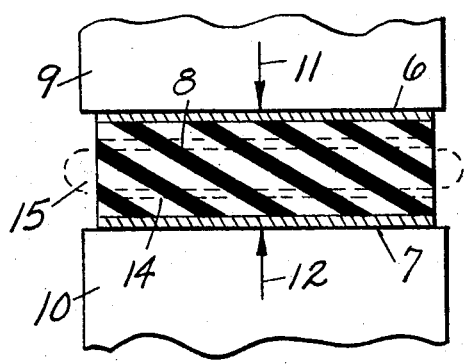
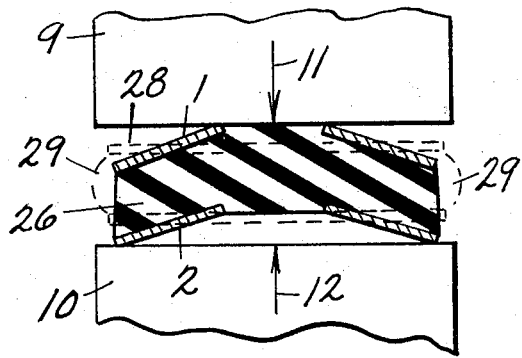
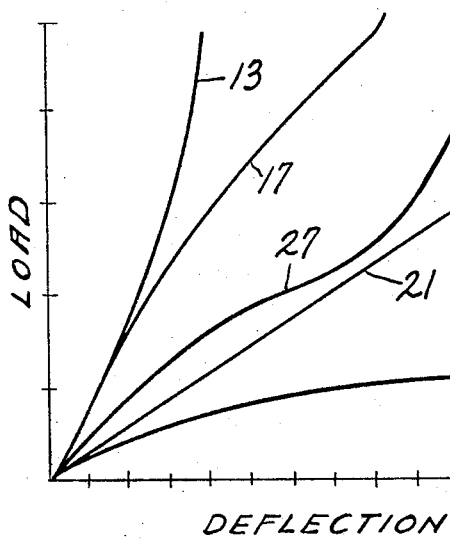
INVENTORS
David G. Thomas
John W. Klos
Hsien-Hwei Shu
BY
Ralph Hammar
Attorney Oct. 18, 1966  D. G. THOMAS ETAL  3,279,779
COMBINED DISC AND ELASTOMERIC SPRING
Filed July 20, 1964

INVENTORS
David G. Thomas
John W. Kloss
Hsien-Hwei Shu
BY
Ralph Hammar
Attorney

United States Patent Office 3,279,779
Patented Oct. 18, 1966

3,279,779
COMBINED DISC AND ELASTOMERIC SPRING
David G. Thomas, John W. Kloss, and Hsien-Hwei Shu, Erie, Pa., assignors to Lord Corporation, a corporation of Pennsylvania
Filed July 20, 1964, Ser. No. 383,755
15 Claims. (Cl. 267—1)

This invention is a spring having a body of elastomer loaded in compression sandwiched between and bonded to disc springs. The disc springs modify the action of the elastomer. In one form, the disc springs are in convex relation, that is, with the springs most widely separated at their center. In another form, the disc springs are in concave relation, that is, with the edges of the springs most widely separated. In still another form, the disc springs are in parallel relation, that is, with the disc springs equally spaced from each other.

Figure 6:
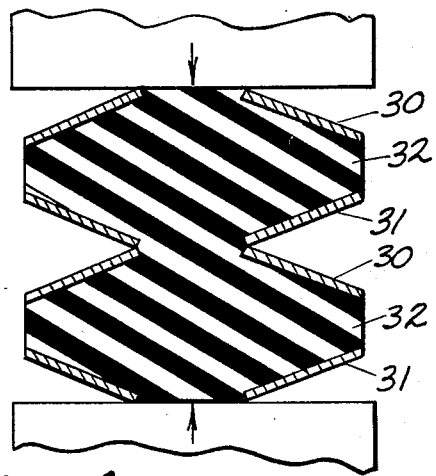
Figure 7:
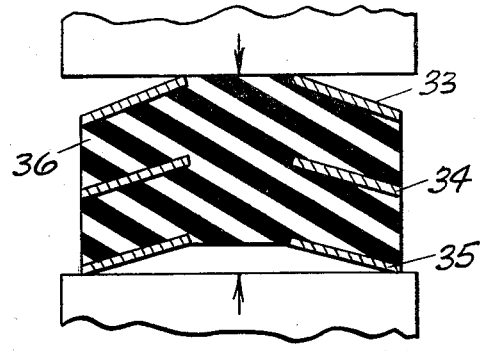
Figure 8:
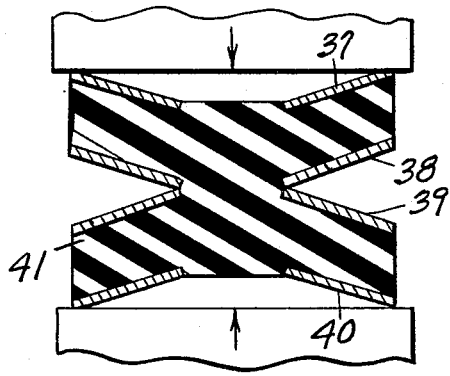
Figure 9:
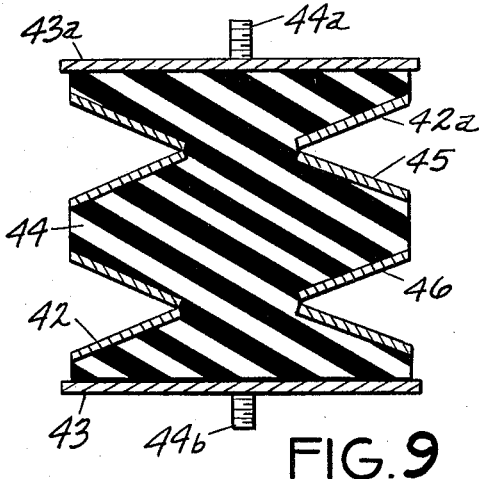
Figure 10:
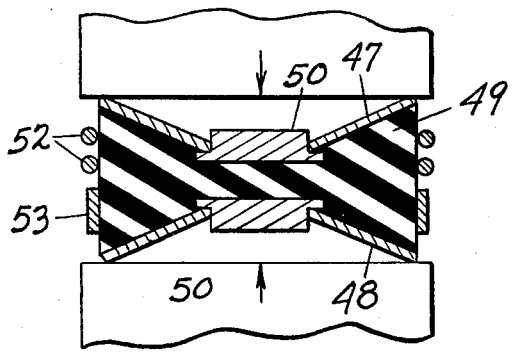

In the drawings, FIG. 1 is a sectional elevation of a spring having a body of elastomer sandwiched between and bonded to two disc springs in convex relation, FIG. 2 is a sectional elevation of a spring having a body of elastomer sandwiched between and bonded to two flat plates, FIG. 3 is a load deflection diagram, FIG. 4 is a sectional elevation through a modification having a body of elastomer between and bonded to two disc springs in concave relation, FIG. 5 is a sectional elevation through a modification having a body of elastomer between two disc springs in parallel relation, FIG. 6 is a section through a unitary assembly of convex springs, FIGS. 7 and 8 are sections through unitary assemblies of parallel type springs, FIG. 9 is a section through an assembly having flat plates at the ends, and FIG. 10 is a section through a concave type spring in which the characteristics are similar to the convex type.

The spring of FIG. 1 has two annular disc springs 1 and 2 arranged in convex relation, that is, with the centers of the springs further separated than the edges. A body 3 of suitable elastomer is sandwiched between and bonded to the disc springs 1 and 2. The disc springs 1 and 2 are common commercial products, sometimes known as Belleville washers. These springs are characterized by a load deflection curve of the general character shown at 4 in FIG. 3. At point 5, the Belleville washers are completely flattened.

In the spring shown in FIG. 2, there are two flat rigid circular end plates 6 and 7 bonded to opposite sides of a body 8 of elastomer. The volume and stiffness of the body 8 is for purposes of comparison the same as the volume and stiffness of the body 3 in FIG. 1. When the spring of FIG. 2 is loaded in compression, for example between members 9 and 10 applying forces in the direction of arrows 11 and 12, the load deflection curve is substantially that shown at 13 in FIG. 3. Upon reaching the maximum load, the spring is compressed substantially to the shape shown by dotted lines 14 with a portion 15 of the elastomer bulging outside the plates 6 and 7. The bulging portion 15 produces a shear stress on the bond between the elastomer and the plates 6 and 7. If the disc springs 1 and 2 were used in series with the FIG. 2 mounting, for example by placing the disc 1 between the member 9 and the plate 6 and by placing the disc 2 between the member 10 and the plate 7, the resultant load deflection curve would correspond initially to that shown in section 4 in FIG. 3, and upon reaching point 5 when the discs 1 and 2 were completely flattened, the load deflection curve would then have a section 16 parallel to the curve 13. The curve 4, 16 is the sum of the curves 4 and 13.

The load deflection curve of the FIG. 1 mounting is shown at 17 in FIG. 3 and shows the performance with the mounting loaded between members 9 and 10 in the direction of arrows 11 and 12, the same structure used to load the FIG. 2 mounting. It will be noted that curve 17 is unlike the curves 13 and 4, 16. At the maximum load, the elastomer and the springs 1 and 2 are deflected to approximately the shape indicated by dotted lines 18. At this deflection, the discs 1 and 2 have flattened, expanding radially and increasing the area through which load is applied to the body 3. While the elastomer bulges, as indicated at 19, the bulge is much less sharp than indicated at 15 and produces less stress on the bond between the elastomer 3 and the discs 1 and 2. As the discs 1 and 2 flatten, the peripheral edges spread apart or separate axially, thereby opening up the bulge area and giving the elastomer more room. This is an explanation for the difference between the sharply bulged section 15 and the gradually bulged section 19. As compared to a combination of the discs 1 and 2 in series with a FIG. 2 mounting, the FIG. 1 mounting with the same volume and stiffness of elastomer and the same discs 1 and 2 will have at full load more than twice the energy storage per inch of deflection. This makes the FIG. 1 mounting highly desirable in applications requiring high energy storage.

The modification of FIG. 4 uses the same disc springs 1 and 2 and a body 20 of elastomer having the same stiffness and volume as the body 3. The springs 1 and 2 are arranged in concave relation with the centers closer to each other than the edges. When this mounting is loaded between members 9 and 10 in the direction of arrows 11 and 12, the load deflection curve is shown at 21, 22 in FIG. 3. Up to point 23, at which the washers 1 and 2 have completely flattened, the section 21 of the curve is extremely linear. After the discs 1 and 2 have flattened, the mounting then takes on the characteristics of the ordinary compression sandwich as indicated by section 22 which is parallel to curve 13. At maximum load, the mouting assumes the position shown by dotted lines 24 in which it will be noted that the bulge 25 is sharper than the bulge 19 but less sharp than the bulge 15. As compared to the combination of springs 1 and 2 with the FIG. 2 mounting, the energy storage at full load per inch of deflection is almost twice as great as the FIG. 2 mounting in series with the disc springs 1 and 2 but is not as great as the FIG. 1 mounting. Where energy storage is important, the FIG. 1 mounting is preferred. Where linearity of the spring rate is important, the FIG. 4 mounting is preferred.

The FIG. 5 mounting uses the same disc springs 1 and 2 and a body 26 of elastomer of the same stiffness and volume as the bodies 3 and 20. When loaded between the members 9 and 10 in the direction of arrows 11 and 12, the load deflection curve is that shown at 27 in FIG. 3. At maximum load, the mounting assumes the position shown by dotted lines 28 in which it will be noted that the bulge indicated at 29 is sharper than the bulge shown at 19 in FIG. 1. In the FIG. 5 mounting, the disc springs 1 and 2 flatten under load but there is no opening up at the peripheral edges as in the FIG. 1 mounting. The characteristics of the FIG. 5 mounting are intermediate the characteristics of the FIGS. 1 and 4 mountings. The characteristics are better than the series arrangement of discs 1 and 2 and the FIG. 2 mounting as shown at 4 and 16 in FIG. 3, but are not as good either from the point of view of linearity or energy storage as the FIG. 1 and FIG. 4 mountings.

In the mountings of FIGS. 1, 4 and 5, the bonding of the elastomer to disc springs permits the springs to modify the load distribution of the elastomer and thereby produce a compression loaded mounting which is relatively soft and yet has better energy storage characteristics than the series combination of the disc springs with the conventional bonded sandwich of FIG. 2. In order that the springs 1 and 2 may modify the spring properties of the elastomer, the springs 1 and 2 are softer than the elastomer.

When several of the springs of FIGS. 1, 4 and 5 are stacked, guides may be necessary. Any of the guides used for Belleville washers may be used, i.e. a single guide pin through the center holes of the washers, several guide pins through the annular portions of the washers or a guide sleeve surrounding the peripheral edges of the washers.

Axial holes in the elastomer for the guide pins soften the springs, thereby changing the characteristics in degree but not in kind.

In all springs, the elastomer introduces damping and eliminates metal to metal contact and thereby protects the disc springs from fretting.

FIG. 6 shows a single unit of a plurality of convex springs in stacked relation, each spring consisting of a pair of disc springs 30, 31 with a body 32 of suitable elastomer sandwiched between and bonded to each pair of springs. The multiple spring unit has the load deflection properties of curve 17. The common elastomer 32 ties the springs together.

FIG. 7 shows a single unit of a plurality of parallel disc springs in stacked relation consisting of disc springs 33, 34, 35 and a body 36 of elastomer sandwiched between and bonded to adjacent disc springs. The load deflection characteristics are those shown at 27. Another unit of similar characteristics having two parallel disc springs is shown in FIG. 8 where parallel disc springs 37, 38 and 39, 40 are bonded to a common body 41 of elastomer.

In the springs so far described, the elastomer has been sandwiched between two disc springs. A rigid plate may be substituted for one of the disc springs, the spring may be in convex or concave relation to the plate. An example of this is shown in FIG. 9 where disc springs 42 and 42a are arranged in convex relation to flat plates 43 and 43a. The plates 43 and 43a respectively have attaching studs 44b and 44a. The flat plates 43, 43a are convenient end members for a stacked unit having a common body 44 of elastomer. The intermediate unit 45, 46 may be omitted or several additional intermediate units may be added to the stack.

In FIG. 10, concave disc springs 47, 48 are bonded to opposite sides of a body 49 of elastomer. With only these parts, the spring would have the characteristics 21, 22, 23 of the FIG. 4 spring. By adding plugs 50 to prevent bulging of the elastomer through the center holes of the disc springs and bands 52, 53 to prevent bulging of the periphery of the elastomer, the characteristics are shifted to those shown by curve 17.

In all forms of the invention, the disc springs are active spring members made of spring material and are not to be confused with the usual shims bonded in the elastomer to restrain bulging under compression load. Such shims are not made of spring material and do not have spring characteristics and are more rigid or stiffer than the elastomer.

What is claimed as new is:

1. A spring comprising axially spaced annular disc springs, and a body of elastomer sandwiched between and bonded to the disc springs, said disc springs having a softer spring rate than the elastomer.

2. The spring of claim 1 in which the disc springs are in convex relation.

3. The spring of claim 1 in which the disc springs are in concave relation.

4. The spring of claim 1 in which the disc springs are in parallel relation.

5. A spring comprising an annular disc spring member spaced axially from another member, and a body of elastomer sandwiched between and bonded to the members, said disc spring member having a softer spring rate than the elastomer.

6. The spring of claim 5 in which the other member has attaching structure.

7. A spring unit comprising a plurality of springs of claim 6 stacked in end to end relation and sharing a common body of elastomer holding the springs together.

8. The spring unit of claim 7 in which at least a plurality of the members are annular disc springs in convex relation.

9. The spring unit of claim 7 in which at least a plurality of the members are annular disc springs in concave relation.

10. The spring unit of claim 7 in which at least a plurality of the members are annular disc springs in parallel relation.

11. A spring unit comprising a pair of axially spaced annular disc springs in parallel relation to each other, another pair of axially spaced annular disc springs in parallel relation to each other but in convex relation to the first pair, said springs being stacked in axial alignment and in end to end relation, and a body of elastomer sandwiched between and bonded to the disc springs, said disc springs having a softer spring rate than the elastomer.

12. A spring unit comprising a pair of axially spaced annular disc springs in concave relation, a plug closing the center hole in one of the disc springs, and a body of elastomer sandwiched between and bonded to said disc springs and plug, said disc springs having a softer spring rate than the elastomer.

13. A spring unit comprising a pair of axially spaced annular disc springs in concave relation, a body of elastomer sandwiched between and bonded to said disc springs, and a peripheral band encircling the elastomer to restrain bulging of the elastomer under compression load.

14. A spring comprising axially spaced annular disc springs in concave relation, a body of elastomer sandwiched between and bonded to the disc springs, and means for restraining bulging of the peripheral surfaces of the elastomer encompassed between the disc springs.

15. A spring comprising axially spaced annular disc springs in concave relation, a body of elastomer sandwiched between and bonded to the disc springs, said disc springs having a softer spring rate than the elastomer, and means for restraining bulging of the elastomer at the center hole of at least one of the disc springs.

References Cited by the Examiner

UNITED STATES PATENTS

| 104,907 | 6/1870 | Vose | 267—1 |
|---|---|---|---|
| 2,260,532 | 10/1941 | Lindeman | 267—63 |

FOREIGN PATENTS

| 816,042 | 7/1959 | Great Britain. |
|---|---|---|
| 951,195 | 10/1956 | Germany. |

ARTHUR L. LA POINT, *Primary Examiner.*

R. M. WOHLFARTH, *Assistant Examiner.*